Dec. 16, 1952  H. P. JACKSON  2,621,929
VERTICALLY UNDULATING PLATFORM ROUNDABOUT
Filed Nov. 27, 1950  3 Sheets-Sheet 1

INVENTOR
Herbert Percy Jackson
By Morris & Bateman
ATTORNEYS

Dec. 16, 1952     H. P. JACKSON     2,621,929
VERTICALLY UNDULATING PLATFORM ROUNDABOUT
Filed Nov. 27, 1950     3 Sheets-Sheet 2
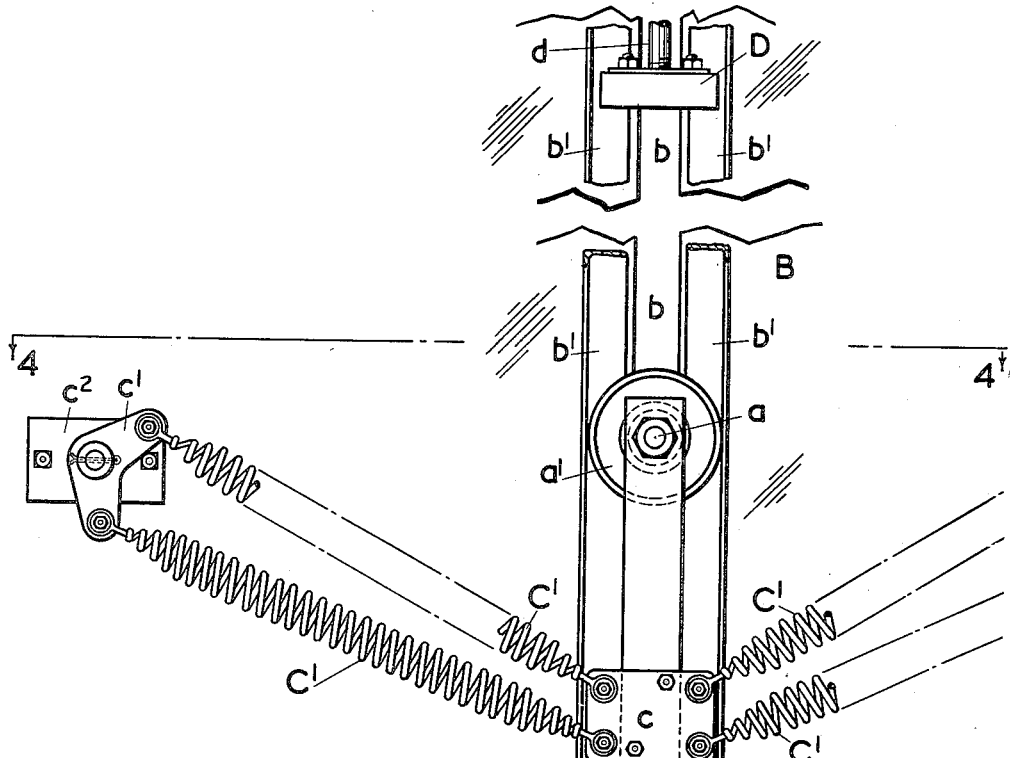
FIG. 3
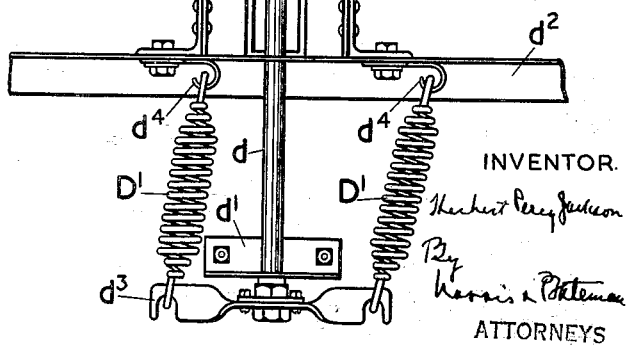
INVENTOR.
ATTORNEYS Dec. 16, 1952   H. P. JACKSON   2,621,929
VERTICALLY UNDULATING PLATFORM ROUNDABOUT
Filed Nov. 27, 1950   3 Sheets-Sheet 3

INVENTOR.
Herbert Percy Jackson
By Harris & Bateman
ATTORNEYS

Patented Dec. 16, 1952

2,621,929

UNITED STATES PATENT OFFICE 2,621,929

VERTICALLY UNDULATING PLATFORM ROUNDABOUT

Herbert Percy Jackson, Congleton, England

Application November 27, 1950, Serial No. 197,663
In Great Britain December 9, 1949

2 Claims. (Cl. 272—44)

This invention relates to improvements in roundabouts of the type in which a series of passenger carrying vehicles or cars are traversed around a stationary undulating path or track to allow of each vehicle or car having independent internal motion imparted thereto.

According to the invention the vehicles or cars are mounted on a wheeled chassis supported on a platform, the vehicles or cars being constrained by a vertical shaft passing through a slot in the platform, to travel radially of the platform as the platform traverses the undulating track.

The invention will be described with reference to the accompanying drawings:

Fig. 3 is a plan of part of one wheeled platform from below to a larger scale.

Figure 2:
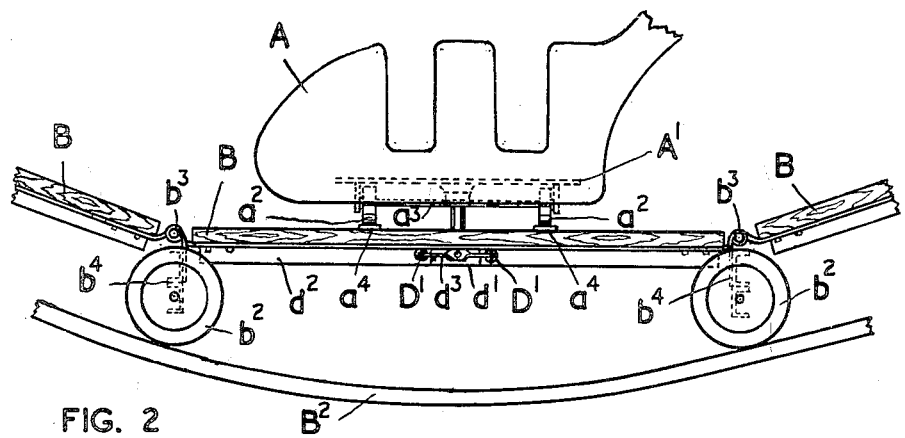
Fig. 2 is an end view on line 2—2 Fig. 1 enlarged and showing the vehicle body in position.
Figure 1:
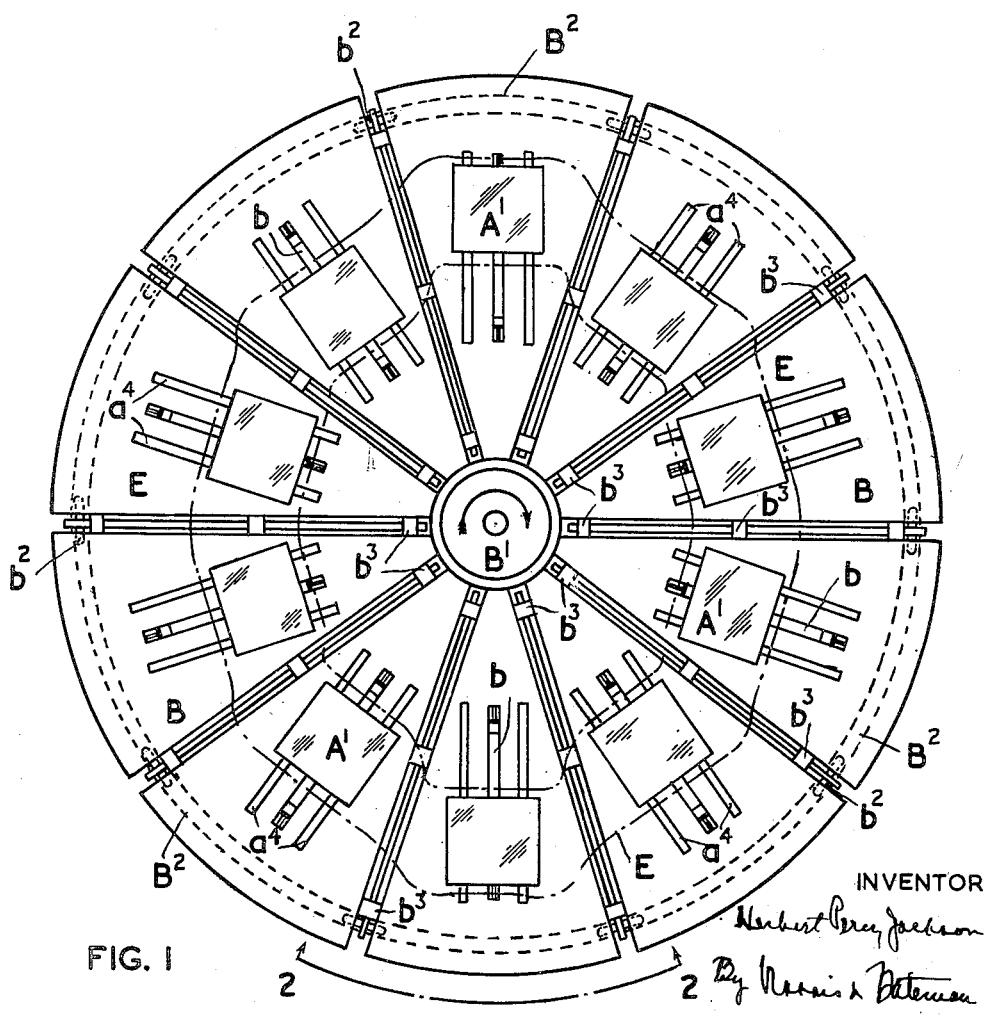
Fig. 1 is a plan of the stationary undulating track with the wheeled platforms mounted thereon, the vehicle bodies being omitted for clearness.
Figure 5:
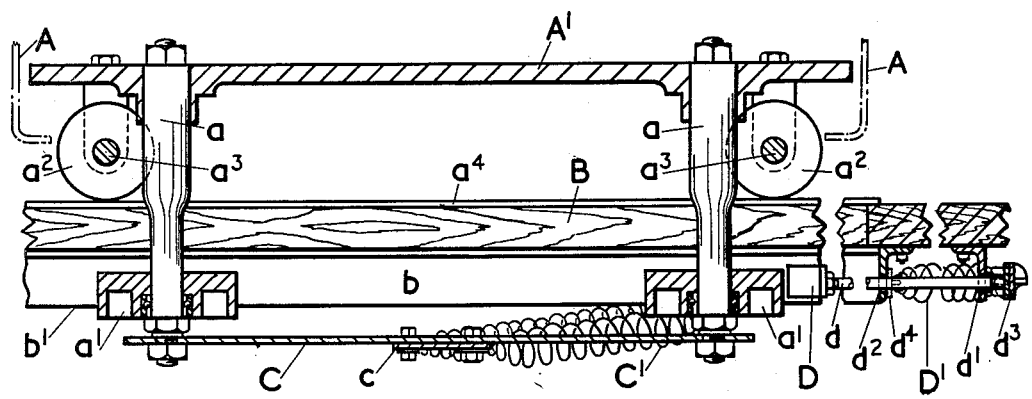
Fig. 5 is a section on line 5—5 Fig. 4.
Figure 4:
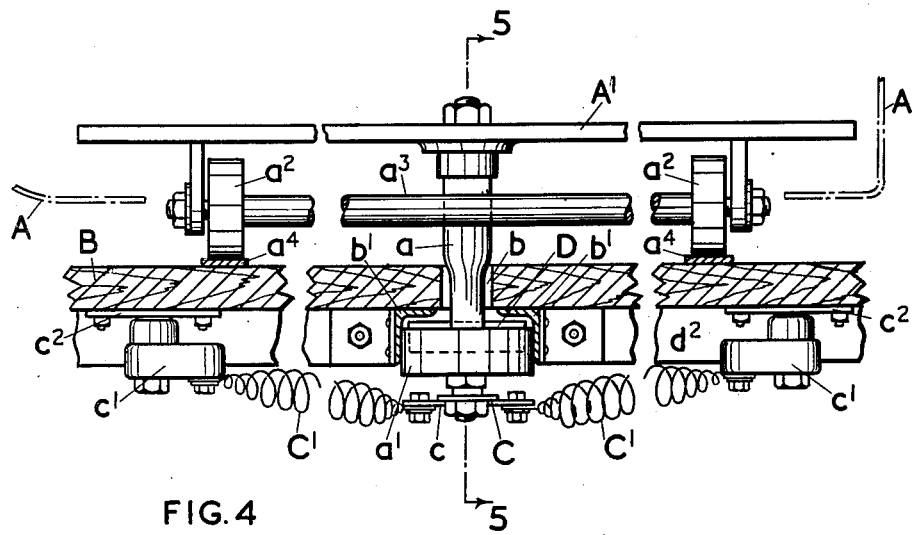
Fig. 4 is a vertical section on line 4—4 Fig. 3.

Each vehicle or car A is mounted on a wheeled chassis $A^1$ arranged radially of a wheeled platform B carried by a vertical driven shaft $B^1$. The platform B rotates in known manner around an undulating path or track $B^2$.

The upper ends of two vertical shafts $a$ are secured to the underside of each chassis $A^1$ to project through a radial slot $b$ in the platform B. A runner or wheel $a^1$ is mounted to rotate on the lower end of each vertical shaft $a$ below the platform B. A pair of angles guides $b^1$ are affixed to the platform B on each side of each slot $b$ by which the runners or wheels $a$ are guided, the horizontal portion of the angles $b^1$ preventing the runners or wheels $a$ from lifting out of the slots $b$.

The chassis $A^1$ is carried on wheels $a^2$ mounted on axles $a^3$ arranged at right angles to the direction of travel of the vehicles or cars A and chassis $A^1$ on the platform B to allow them to move radially thereof as the platform B undulates during rotation over the track $B^2$. The wheels $a^2$ may travel on runways $a^4$ arranged parallel to the slot $b$ on the platform B.

The lower ends of the vertical shafts $a$ are connected together by a flat rod C to which is bolted a plate $c$ carrying studs to which one end of two pairs of springs $C^1$ are attached, the opposite ends of each pair of springs $C^1$ being attached to brackets $c^1$ pivoted on plates $c^2$ bolted to the underside of the platform B.

A buffer disc D is mounted on a rod $d$ arranged centrally of the radial slot $b$ at each end thereof, the rod $d$ passing through a bracket $d^1$ bolted to the underside of the platform B and also through the flange of an angle member $d^2$ supporting the guides $b^1$. A bracket $d^3$ is mounted on the end of the rod $d$ to which are affixed the ends of two springs $D^1$, the other ends of which are attached to hooks $d^4$ bolted to the angle member $d^2$.

As the outer periphery of the platform B which rotates on wheels $b^2$ mounts a rise on the undulating track $B^2$ the chassis $A^1$ and vehicle or car A travel inwards along the slot $b$ against the action of the pairs of springs $C^1$ until the inner runner or wheel $a^1$ comes in contact with the inner buffer disc D which moves outwards against the action of the springs $D^1$ to bring the chassis $A^1$ and vehicle or car A to rest. When the chassis $A^1$ has come to rest the platform B will have travelled over the rise on the track $B^2$ and will be approaching a depression thereon to lower the outer periphery of the platform B below the point of suspension of its inner end on the central shaft $B^1$. The chassis $A^1$ and vehicle or car A accordingly commence to travel radially outwards under the initial action of the springs $D^1$ and springs $C^1$ assisted by centrifugal force and gravity until the chassis approaches the periphery of the platform B when the outer runner or wheel $a$ engages the buffer disc D at the outer end of the slot $b$, the disc D under the action of its springs $D^1$ and the pairs of springs $C^1$ bringing the chassis $A^1$ and vehicle or car A to rest preparatory to a further inward travel as the wheels $b^2$ again meet a rise on the track $B^2$.

A plurality of platforms B of substantially segmental shape are arranged around the central shaft $B^1$ to which their inner ends are attached. Adjacent platforms are connected together at their outer peripheries by hinges $b^3$ affixed to angle brackets $b^4$ supporting the wheels $b^2$ which travel over the undulating track $B^2$ (Fig. 2).

A plurality of vehicles or cars A on chassis $A^1$ are mounted on the platforms B, the shafts $a$ from the chassis $A^1$ projecting through the radial slots $b$ in the platforms B. The platforms B are rotated at such a speed that the centrifugal force generated by the rotation of the platforms is insufficient to overcome the force of gravity under which the vehicle or car A travels inwards.

The vehicles or cars A may be of any shape and may be connected together by a concertina like hood E to simulate a caterpillar.

What we claim is:

1. A roundabout of the type referred to comprising vehicle chassis, a plurality of radially slotted segmental platforms, hinges connecting the segmental platforms together at their outer ends, a vertical driving shaft to which the inner ends of the platforms are attached, an undulating track, wheels on each platform engaging the track, vertical shafts bolted to each chassis and projecting through the slot in the platform carrying the chassis, a rod connecting the ends of the vertical shafts below the platforms, a plate on the rod, springs attached at one end to said plate and extending laterally from the opposite sides of said plate, means for attaching the other ends of said springs to the platform at opposite sides of the slot therein, said springs extending at angles to said plate to yieldingly oppose inward movement of the chassis, a roller on the lower end of each vertical shaft, angle guides on the underside of the platform along each side of the slot in which the rollers run, and wheels on the chassis engaging the upper surface of the platform over which the chassis travels radially as the platform rotates.

2. A roundabout of the type referred to comprising vehicle chassis, a plurality of radially slotted segmental platforms, hinges connecting the segmental platforms together at their outer ends, a vertical driving shaft to which the inner ends of the platforms are attached, an undulating track, wheels on each platform engaging the track, vertical shafts bolted to each chassis and projecting through the slot in the platform carrying the chassis, a rod connecting the ends of the vertical shafts below the platforms, a plate on the rod, tension springs attached at one end to the plate and extending laterally from opposite sides thereof, means fixed to the platform at opposite sides of the slot therein and attached to the other ends of said springs, said springs extending at angles to said plate to yieldingly oppose inward movement of the chassis, a roller on the lower end of each vertical shaft, angle guides on the underside of the platform along each side of the slot in which the rollers run, wheels on the chassis engaging the upper surface of the platform over which the chassis travels radially as the platform rotates, and spring operated buffers at the outer and inner ends of the slots in the platform to bring the chassis to rest at the end of its radial travel in either direction.

HERBERT PERCY JACKSON.

REFERENCES CITED

The following references are of record in the file of this patent:

UNITED STATES PATENTS

| Number | Name | Date |
|---|---|---|
| 508,994 | Sprague | Nov. 21, 1893 |
| 1,293,393 | Feltman | Feb. 4, 1919 |
| 1,501,613 | Maynes | July 15, 1924 |
| 2,225,411 | Feltman | Dec. 17, 1940 |

FOREIGN PATENTS

| Number | Country | Date |
|---|---|---|
| 5,137 | Great Britain | 1896 |